(12) United States Patent
Williams et al.

(10) Patent No.: US 6,317,455 B1
(45) Date of Patent: *Nov. 13, 2001

(54) SYSTEM AND METHOD FOR USER INFORMATION TRANSFER BEFORE MODEM CONNECTION

(75) Inventors: Richard G. C. Williams, San Diego; John Rosenlof, La Mesa, both of CA (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,313

(22) Filed: Dec. 16, 1997

(51) Int. Cl.[7] .............................. H04B 1/470; H03H 7/30; H04L 7/10
(52) U.S. Cl. ........................ 375/222; 375/231; 375/366; 395/200.58; 395/200.78
(58) Field of Search ..................... 364/724.2; 375/222, 375/219, 224, 225, 229, 230, 231, 232, 364, 365, 366, 367, 368; 333/28 R, 28 T; 379/90.01, 93.01, 93.05, 93.06; 395/200.3, 200.38, 200.39, 200.4, 200.57, 200.58, 200.6, 200.61, 200.62, 200.63, 200.64, 200.78

(56) References Cited

U.S. PATENT DOCUMENTS

| | | | |
|---|---|---|---|
| 5,394,346 | * 2/1995 | Milsom | 364/578 |
| 5,751,701 | * 5/1998 | Langberg et al. | 370/281 |
| 5,790,594 | * 8/1998 | Peng | 375/222 |
| 5,852,631 | * 12/1998 | Scott | 375/222 |
| 5,864,714 | 1/1999 | Tal et al. | |

* cited by examiner

*Primary Examiner*—William Luther
(74) *Attorney, Agent, or Firm*—McDonnell Boehnen Hulbert & Berghobb

(57) ABSTRACT

A system and method for user information transfer before modem connection. The invention makes high-speed modems more efficient, particularly for transaction and Internet applications, by providing for transmission of pre-connection user data during modem training. A training sequence for a modem in accordance with the invention may be summarized as follows: beginning training of the modem at a first data rate using a defined training sequence; after a selected amount of training, transmitting pre-connection user data from the modem at up to the first data rate while continuing training of the modem; ending training; and enabling transmission of user data at a full connected data rate of the modem. The invention may also include the following training sequence before enabling transmission of user data at the full connected data rate of the modem: beginning secondary training of the modem at a second data rate using a defined training sequence; after a selected amount of secondary training, transmitting pre-connection user data from the modem at up to the second data rate while continuing secondary training of the modem; and ending secondary training.

38 Claims, 3 Drawing Sheets

SYSTEM AND METHOD FOR USER INFORMATION TRANSFER BEFORE MODEM CONNECTION

TECHNICAL FIELD

This invention relates to data communications, and more particularly to data communications using modem devices requiring training prior to data transmission.

BACKGROUND

Data communications often involves the use of modulator/demodulators (modems) or modem-like devices (e.g. Digital Subscriber Line devices, 56 kbps digital "modems", etc.) to communicate over a network system having at least one network link that uses an analog signaling scheme. For example, as shown in FIG. 1, two computers 1, 2 may each have a modem link 3, 4 (land-line or wireless) to the public switched telephone network 5. Generally, at least part of the virtual circuit connecting the two computers 1, 2 will be analog in nature.

A characteristic of analog links is that various components in the link, such as 2-wire to 4-wire hybrids, can cause echos in the link. Further, variations in analog component values can change operating characteristics of the link. Accordingly, under many current standards, such as the ITU V.34 standard defining a 33,600 kbps data signaling rate, modems conforming to the standard perform various training routines to set equalization and echo canceling parameters before commencing data transmission. For example, FIG. 2 shows a bi-directional signaling diagram of one type of routine, in which modem A is conducting identification and line probings routines with a second modem B (not shown). Initially, modem A transmits a known training sequence, PSA, to modem B for a preset, minimum time period (for example, about 0.15 secs.). Using the PSA sequence, modem A trains its echo canceling circuitry while modem B trains its equalizer circuitry, in known fashion. After the PSA sequence is transmitted for no more than a preset, maximum time period, modem A transmits an end-of-sequenice marker, EOSA.

After receiving the EOSA marker, modem B transmits a known training sequence, PSB, to modem A for a preset, minimum time period (for example, about 0.15 secs.). Using the PSB sequence, modem B trains its echo canceling circuitry while modem A trains its equalizer circuitry, in known fashion. After the PSB sequence is transmitted for no more than a preset, maximum time period, modem B transmits an end-of-sequence marker, EOSB.

Under the V.34 standard, this initial round of training is at a relatively low rate, typically about 6,000 bps. A second round of training at a low-to-mid rate (e.g., about 12,000 bps) then takes place, in similar fashion. That is, after receiving the EOSB marker, modem A transmits a known training sequence, PSA', to modem B for a preset, minimum time period (for example, about 0.15 secs.). Using the PSA' sequence, modem A trains its echo canceling circuitry for a higher data rate while modem B trains its equalizer circuitry, in known fashion. After the PSA' sequence is transmitted for no more than a preset, maximum time period, modem A transmits an end-of-sequence marker, EOSA'. Modem A is then fully trained, and may begin to transmit user data, DataA, at the full connected modem rate. Meanwhile, modem B performs this second round of training concurrently with training for modem A. That is, essentially immediately alter the EOSB marker, modem B transmits a known training sequence, PSB', to modem A for a preset, minimum time period (for example, about 0.15 secs.). Using the PSB' sequence, modem B trains its echo canceling circuitry for a higher data rate while modem A trains its equalizer circuitry, in known fashion. After the PSB' sequence is transmitted for no more than a preset, maximum time period, modem B transmits an end-of-sequence marker, EOSB'. Modem B is then fully trained, and may begin to transmit user data. DataB, at the full connected modem rate.

Such standard training may take from 5 to 15 seconds for high-speed (e.g., 14,400 bps or faster) modems before user data can be transmitted or received by either modem. Such a delay is undesirable for "transaction modems", which are typically used at point-of-sale (POS) terminals to conduct such transactions as check verification, credit card validation, etc. Slower modems (e.g., 300–1,200 bps) having faster training times have often been used as transaction modems, and can be satisfactory if transactions always involve a small amount of data (e.g., ten's of bytes of data, sufficient, for example, for validating a credit card number). However, such modems are undesirable if a substantial amount of data must be transmitted more than occasionally. Thus, more and more frequently, high-speed modems are being used for transaction applications. Similarly, such training times for standard modems adversely impacts the response time of modem access to the Internet.

One way of shortening the training time of high-speed modems is to only train for the minimum time allowed by a data signaling standard. However, this approach results in a lower data rate at the end of the training period than if training had been performed for a greater time period.

Thus, the inventors have determined that it would be desirable to make high-speed modems more efficient, particularly for transaction and Internet applications.

SUMMARY

The invention includes a system and method for modem information transfer before connection. The invention makes high-speed modems more efficient, particularly for transaction and Internet applications by providing for transmission of pre-connection user data during modem training. A training sequence for a modem in accordance with the invention may be summarized as follows:

(1) beginning training of the modem at a first data rate using a defined training sequence;

(2) after a selected amount of training transmitting pre-connection user data from the modem at up to the first data rate while continuing training of the modem;

(3) ending training;

(4) enabling transmission of user data at a full connected data rate of the modem.

The invention may also include the following training sequence before enabling transmission of user data at the lull connected data rate of the modem:

(5) beginning secondary training of the modem at a second data rate using a defined training sequence;

(6) after a selected amount of secondary training, transmitting pre-connection user data from the modem at up to the second data rate while continuing secondary training of the modem;

(7) ending secondary training.

In a typical implementation complying with the ITU V.34 standard, the time available for each modem to transmit pre-connection user data during training is about 1.6 secs. at about 6,000 bps in the initial training sequence, and about 1.8 secs. at about 12,000 bps in the secondary training sequence. Thus, a total of more than about 9,000 bits, and generally more than about 20,000 bits, and possibly more than about 31,000 bits, can be sent in each direction during the training cycles. This amount of data would often be adequate to complete many transactions or exchanges of Internet protocol setup information. Thus, the invention would allow a high speed modem to have response times comparable to lower speed modems while having the ability to communicate at much higher speeds for larger amounts of data.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
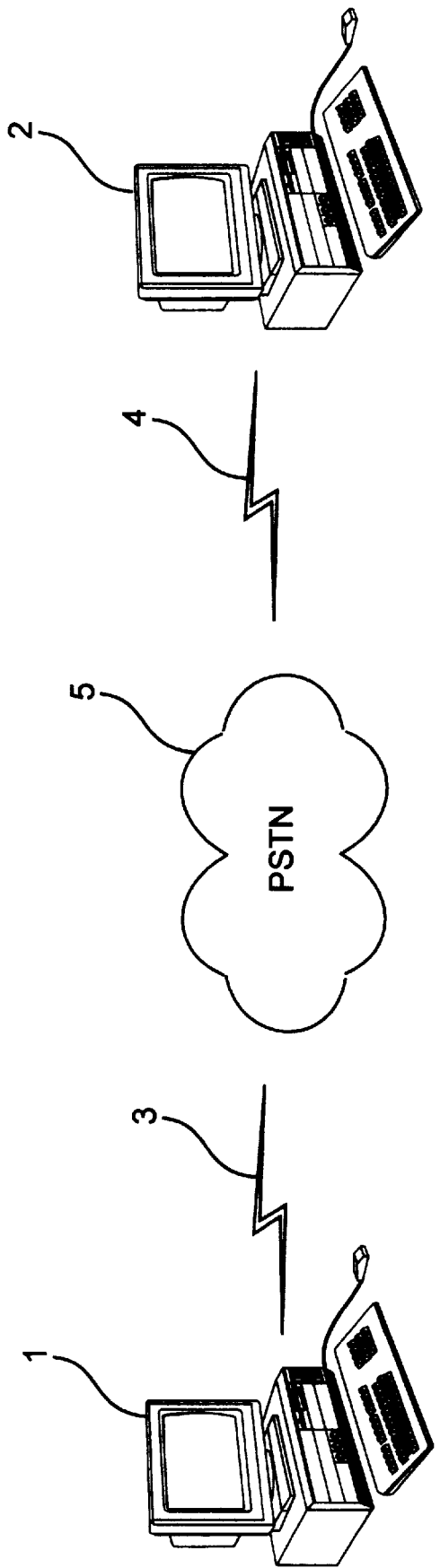
FIG. 1 is a block diagram of two computers connected by a modem to the public switched telephone network, in accordance with the prior art.
Figure 2:
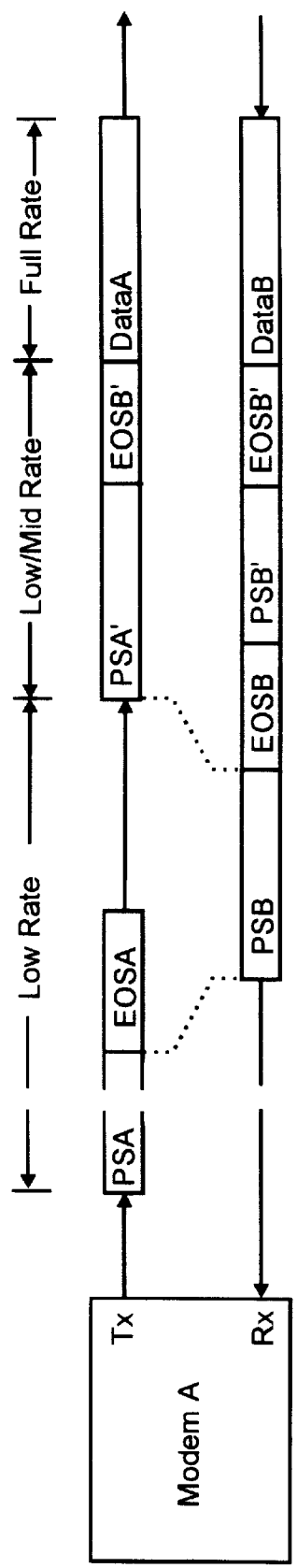
FIG. 2 shows a bi-directional signaling diagram of modem training routines, in accordance with the prior art.
Figure 3:
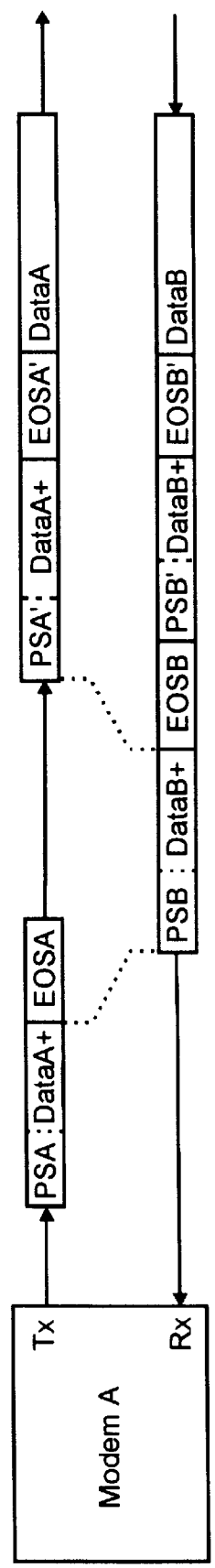
FIG. 3 shows a bi-directional signaling, diagram of modem training and data transfer routines in accordance with the invention.

FIG. 3 shows a bi-directional signaling diagram of modem training and data transfer routines in accordance with the invention. Initially, modem A transmits a known training, sequence, PSA, to modem B (not shown) for a preset, minimum time period (for example, about 0.15 secs.). Almost always such training sequences are pseudo-random. Using the PSA sequence, modem A trains its echo canceling circuitry while modem B trains its equalizer circuitry, in known fashion. The PSA sequence is transmitted a relatively low rate, typically about 6,000 bps for the V.34 standard.

In contrast to the prior art, after the PSA sequence has been transmitted for a sufficient time to permit some training to occur in both modems, modem A transmits "pre-connection" user data, DataA+, to modem B. The pre-connection user data preferably is marked with a synchronization prefix, such as a prescribed sequence of binary 0's, to positively indicate the beginning of the pre-connection user data. In order to permit modem A to continue to train its echo canceling circuitry and modem B to continue to train its equalizer circuitry using defined training bit sequences, the pre-connection user data preferably is first scrambled to appeal to be pseudo-random, in known fashion. The receiving modem unscrambles the pre-connection user data, in known fashion. The DataA+ pre-connection user data is preferably sent at the same rate as the PSA sequence, but may be sent at a lower effective rate.

During at least some early portion of training, the modem needs to know the exact signal transmitted. However, after a certain amount of training—normally less than the minimum duration set by most standards—a training modem knows the points that are being used sufficiently well to no longer need to know the sequence that is being sent. Hence, the modem may chance front data-directed training to decision-directed training. Thus, the modem can use training, points both to train and to transmit or receive pre-connection user data. To optimize such training, the preferred embodiment of the invention uses scrambled, pseudo-random pre-connection user data. By using scrambled, pseudo-random pre-connection data, training continues as in the prior art, but without a resulting lower data rate as in the case of simply shortening training to the minimum time allowed by a data signaling standard.

At the point in time where a full PSA sequence should terminate (i.e., when modem A has sufficiently trained its echo cancellation and before a preset, maximum time period), modem A transmits all end-of-sequence marker, EOSA. It may be desirable to positively indicate the end of the pre-connection user data before the EOSA marker, such as by sending a sequence of binary 1's between the DataA+ and the EOSA marker.

After receiving the EOSA marker, modem B transmits a known training sequence, PSB, to modem A for a preset, minimum time period (for example, about 0.15 secs.). Using the PSB sequence, modem B trains its echo canceling circuitry while modem A trains its equalizer circuitry, in known fashion. After the PSB sequence has been transmitted for a sufficient time to permit some training to occur in both modems, modem B transmits pre-connection user data, DataB+, to modem A. The pre-connection user data preferably is marked with a synchronization prefix to positively indicate the beginning of the pre-connection data. Again, the pre-connection user data preferably is first scrambled to appear to be pseudo-random. At the point in time where a full PSB sequence should terminate (i.e., when modem B has sufficiently trained its echo cancellation and before a preset, maximum time period), modem B transmits an end-of-sequence marker, EOSB. The DataB+ pre-connection user data is preferably sent at the same rate as the PSB sequence, but may be sent at a lower effective rate.

As in the prior art, a secondary cycle of training at a low-to-mid rate (e.g., about 12,000 bps) may then take place, in similar fashion. That is, after receiving the EOSB marker, modem A transmits a known training sequence, PSA', to modem B for a preset, minimum time period (for example, about 0.15 secs.). Using the PSA' sequence, modem A trains its echo canceling circuitry for a higher data rate while modem B trains its equalizer circuitry, in known fashion. After the PSA' sequence has been transmitted for a sufficient time to permit some training at the higher rate to occur in both modems, modem A again transmits pre-connection user data, DataA'+, to modem B. The pre-connection user data preferably is marked with a synchronization prefix to positively indicate the beginning of the pre-connection data. Again, the pre-connection user data preferably is first scrambled to appear to be pseudo-random. At the point in time where a full PSA' sequence should terminate (i.e., when modem A has sufficiently trained its echo cancellation and before a preset, maximum time period), modem A transmits an end-of-sequence marker, EOSA'. Modem A is then fully trained, and may transmit user data, DataA, at the full modem rate (i.e., the modems are "connected"). The DataA'+ pre-connection user data is preferably sent at the same rate as the PSA' sequence. But may be sent at a lower effective rate.

Meanwhile, modem B performs this second round of training concurrently with training for modem A. That is, essentially immediately after the EOSB marker, modem B transmits a known training sequence, PSB', to modem A for a preset, minimum time period (for example, about 0.15 secs.). Using the PSB' sequence, modem B trains its echo canceling circuitry for a higher data rate while modem A trains its equalizer circuitry, in known fashion. After the PSB' sequence has been transmitted for a sufficient time to permit some training at the higher rate to occur in both modems, modem B again transmits pre-connection user data, DataB'+, to modem A. The pre-connection user data preferably is marked with a synchronization prefix to positively indicate the beginning of the pre-connection user data. Again, the pre-connection user data preferably is first scrambled to appear to be pseudo-random. At the point in time where a full PSB' sequence should terminate (i.e., when modem B has sufficiently trained its echo cancellation and before a preset, maximum time period), modem B transmits an end-of-sequence marker, EOSB'. Modem B is then fully trained, and may transmit user data, DataB, at the full modem rate (i.e., the modems are "connected"). The DataB'+ pre-connection user data is preferably sent at the same rate as the PSB' sequence, but may be sent at a lower effective rate.

In the preferred embodiment, both modems must be capable of exchanging pre-connection user data during the training cycle. The pre-connection user data exchanged during the training cycle can be pre-defined (e.g., a fixed format) or can include bits that indicate the purpose of the data. The pre-connection user data may be user data (e.g., email messages or Internet browser preferences), or it may be optional system data used to negotiate higher level communication protocols that the user has requested (e.g., an Internet protocol).

Generally, a signaling method is needed between each modem and a modem controller or user interface to enable pre-connection user data to flow outside of the physical modem link. One such method is to use conventional modem control signals, such as CD (carrier detect) and CTS (clear-to-send) to provide "out-of-channel" signaling and flow control. Other techniques, such as known methods of "in-channel" signaling and flow control, may be used.

The training sequence for a modem in accordance with the invention may thus be summarized as follows:

(1) beginning training of the modem at a first data rate using a defined training sequence.

(2) after a selected amount of training, transmitting, pre-connection user data from the modem at up to the first data rate while continuing training of the modem;

(3) ending training;

(4) enabling transmission of user data at a full connected data rate of the modem.

The invention may also include the following training sequence before enabling transmission of user data at the full connected data rate of the modem:

(5) beginning secondary training, of the modem at a second data rate using a defined training sequence;

(6) after a selected amount of secondary training, transmitting pre-connection user data from the modem at up to the second data rate while continuing secondary training of the modem;

(7) ending secondary training.

In a typical implementation complying with the ITU V.34 standard, the time available for each modem to transmit pre-connection user data during training is about 1.6 secs. at about 6,000 bps in the initial training sequence, and about 1.8 secs. at about 12,000 bps in the secondary training sequence. Thus, a total of more than about 9,000 bits, and generally more than about 20,000 bits, and possibly more than about 31,000 bits, can be sent in each direction during the training cycles. This amount of data would often be adequate to complete many transactions or exchanges of Internet protocol setup information. Thus, the invention would allow a high speed modem to have response times comparable to lower speed modems while having the ability to communicate at much higher speeds for larger amounts of data. The amount of information that may be transmitted between modems before connection may vary with the data rate of the training cycles.

The invention may be implemented in hardware or software, or a combination of both. However, preferably, the invention is implemented in a conventional modem by means of a computer program executing on one or more programmable systems each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion. The processor may be, for example, a digital signal processor (DSP).

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer programs where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example the data rates for initial and secondary training may vary from the rates described above. Further, the training may include link optimizations other than echo cancellation and equalization. As another example, the invention may be used with modern pairs that accommodate more than two training cycles, and/or pre-connection user data may be sent during only one of the training cycles. Accordingly, other embodiments are within the scope of the following claims.

What is claimed is:

1. A method for providing modem user data transfer before connection, comprising the steps of:

(a) beginning training of a modem at a first data rate using a defined training sequence;

(b) after a selected amount of training, transmitting first pre-connection user data from the modem at up to the first data rate while continuing, training of the modem;

(c) ending training;

(d) enabling transmission of user data at essentially a full connected data rate of the modem.

2. The method of claim 1, further including before the step of enabling transmission of user data at the full connected data rate of the modem, the steps of:

(a) beginning secondary training of the modem at a second data rate using a pseudo-random sequence:

(b) after a selected amount of secondary training, transmitting second pre-connection user data from the modem at up to the second data rate while continuing secondary training of the modem;

(c) ending secondary training.

3. The method of claims 1 or 2, wherein training includes echo cancellation training.

4. The method of claims 1 or 2, wherein training includes equalization training.

5. The method of claims 1 or 2, wherein either or both of the first and second pre-connection user data is preceded by a synchronization prefix.

6. The method of claims 1 or 2, wherein either or both of the first and second pre-connection user data is succeeded by a positive indicator.

7. The method of claims 1 or 2, wherein either or both of the first and second pre-connection user data is pseudo-randomized before transmitting.

8. The method of claim 1, wherein the first data rate is about 6,000 bps.

9. The method of claim 2, wherein the second data rate is about 12,000 bps.

10. A system for providing modem user data transfer before connection, comprising:

(a) means for initiating training of a modem at a first data rate using a defined training sequence;

(b) means for transmitting first pre-connection user data from the modem at up to the first data rate after a selected amount of training while continuing training of the modem;, (c) means for ending training;

(d) means for enabling transmission of user data at essentially a full connected data rate of the modem.

11. The system of claim 10, further including:

(a) means for beginning secondary training of the modem at a second data rate using, a defined training sequence before enabling transmission of user data at the full connected data rate of the modem;

(b) means for transmitting second pre-connection user data from the modem at up to the second data rate after a selected amount of secondary training while continuing secondary training of the modem;

(c) means for ending, secondary training.

12. The system of claims 10 or 11, wherein training includes echo cancellation training.

13. The system of claims 10 or 11, wherein training includes equalization training.

14. The system of claims 10 or 11, wherein either or both of the first and second pre-connection user data is preceded by a synchronization prefix.

15. The system of claims 10 or 11, wherein either or both of the first and second pre-connection user data is succeeded by a positive indicator.

16. The system of claims 10 or 11, wherein either or both of the first and second pre-connection user data is pseudo-randomized before transmitting.

17. The system of claim 10, wherein the first data rate is about 6,000 bps.

18. The system of claim 11, wherein the second data rate is about 12,000 bps.

19. A computer program, residing on a computer-readable medium, for providing modem user data transfer before connection, comprising instructions for causing a computer to:

(a) begin training of a modem at a first data rate using a defined training sequence;

(b) after a selected amount of training, transmit first pre-connection user data from the modem at up to the first data rate while continuing training of the modern;

(c) end training;

(d) enable transmission of user data at essentially a full connected data rate of the modem.

20. The computer program of claim 19, further including instructions for causing a computer, before the function of enabling transmission of user data at the full connected data rate of the modem, to:

(a) begin secondary training of the modem at a second data rate using a defined training sequence;

(b) after a selected amount of secondary training, transmit second pre-connection user data from the modem at up to the second data rate while continuing, secondary training of the modem:

(c) end secondary training.

21. The computer program of claims 19 or 20, wherein training includes echo cancellation training.

22. The computer program of claims 19 or 20, wherein training includes equalization training.

23. The computer program of claims 19 or 20, wherein either or both of the first and second pre-connection user data is preceded by a synchronization prefix.

24. The computer program of claims 19 or 20, wherein either or both of the first and second pre-connection user data is succeeded by a positive indicator.

25. The computer program of claims 19 or 20, wherein either or both of the first and second pre-connection user data is pseudo-randomized before transmitting.

26. The computer program of claim 19, wherein the first data rate is about 6,000 bps.

27. The computer program of claim 20, wherein the second data rate is about 12,000 bps.

28. A method for enabling transmission of at least about 9,000 bits of user data at least one way over a V.34 compliant modem before completion of an essentially full data rate modem connection, comprising the steps of:

(a) beginning training of the modem at a training data rate, less than the full data rate, using a defined training sequence;

(b) after a selected amount of training, transmitting pre-connection user data from the modem at up to the training data rate while continuing training of the modem;

(c) ending training.

29. A system for enabling transmission of at least about 9,000 bits of user data at least one way over a V.34 compliant modem before completion of an essentially full data rate modem connection, comprising:

(a) means for beginning training of the modem at a training data rate, less than the full data rate, using a defined training sequence;

(b) means for transmitting pre-connection user data from the modem at up to the training data rate after a selected amount of training while continuing training of the modem;

(c) means for ending training.

30. A computer program, residing on a computer-readable medium, for enabling transmission of at least about 9.000 bits of user data at least one way over a V.34 compliant modem before completion of an essentially full data rate modem connection, comprising instructions for causing a computer to:

(a) begin training of the modem at a training data rate, less than the full data rate, using a defined training sequence;

(b) after a selected amount of training, transmit pre-connection user data from the modem at up to the training data rate while continuing training of the modem;

(c) end training.

31. A method for providing modem user data transfer before connection, comprising:

(a) beginning a primary training of a modem at a first data rate using a defined training sequence;

(c) ending the primary training;

(a) beginning a secondary training of the modem at a second data rate using a pseudo-random sequence;

(b) after a selected amount of secondary training, transmitting pre-connection user data from the modem at up to the second data rate while continuing secondary training of the modem;

(c) ending secondary training, (d) enabling transmission of user data at essentially a full connected data rate of the modem.

32. The method of claim 31, wherein the training includes echo cancellation training.

33. The method of claim 31, wherein training includes equalization training.

34. The method of claim 31, wherein the pre-connection user data is preceded by a synchronization prefix.

35. The method of claim 31, wherein the pre-connection user data is succeeded by a positive indicator.

36. The method of claim 31, wherein the pre-connection user data is pseudo-randomized before transmitting.

37. The method of claim 31, wherein the first data rate is about 6,000 bps.

38. The method of claim 31, wherein the second data rate is about 12,000 bps.

* * * * *